United States Patent [19]
Holz

[11] 3,785,495
[45] Jan. 15, 1974

[54] PRESSURE FILTER FOR FIBROUS SUSPENSIONS

[75] Inventor: Emil Holz, Eningen/Wuertt, Germany

[73] Assignee: Hermann Finckh Metalltuch- und Maschinenfabrik, Reutlingen/Wuertt, Germany

[22] Filed: Aug. 27, 1971

[21] Appl. No.: 175,446

[30] Foreign Application Priority Data
Aug. 16, 1971 Germany............................ 2140904

[52] U.S. Cl.................. 210/210, 210/338, 210/396, 210/436, 209/273, 209/306
[51] Int. Cl............................................ B01d 33/06
[58] Field of Search...................... 210/78, 372, 373, 210/374, 380, 377, 210, 338, 396, 436; 209/273, 306

[56] References Cited
UNITED STATES PATENTS

| | | | |
|---|---|---|---|
| 1,415,939 | 5/1922 | Mabry............................ | 210/377 X |
| 1,630,201 | 5/1927 | Metcalfe........................... | 210/380 |
| 3,387,708 | 6/1968 | Salomon et al..................... | 209/273 |
| 3,677,402 | 7/1972 | Holz.................................. | 209/273 |

Primary Examiner—Samih N. Zaharna
Assistant Examiner—F. F. Calvetti
Attorney—Spencer & Kaye

[57] ABSTRACT

A multiple stage pressure filter for suspensions of fibrous materials including a housing having a cover and a fixed upright filter basket, a rotor concentric thereto and a rotor drive mounted therein. The rotor is provided with at least one carrier connected to a shaft of the rotor drive, a second filter basket provided on the rotor, and at least one fixed scrubbing member associated with the second filter. In one embodiment, the carrier is arranged under the second filter basket while the scrubbing member is secured to the cover.

9 Claims, 5 Drawing Figures

PRESSURE FILTER FOR FIBROUS SUSPENSIONS

The present invention relates to a multi-stage pressure filter for filtering suspensions, and more particularly to a multi-stage pressure filter with a fixed upright filter basket and a rotor concentric thereto rotating within the filter basket. The fixed basket and the rotor are accommodated in a housing with a removable cover. The housing contains the bearing assembly and the rotor drive in its lower section, has at least one carrier in connection with a driven shaft as well as with a second filter basket on the rotor, the upper edge of which is higher than the upper edge of the fixed filter basket, into which the suspension to be filtered is fed from outside, and has at least one fixed scrubbing element disposed on its inner side.

Such a pressure filter is disclosed, for example, in German Pat. No. 1,946,948. On the machine the rotor is designed as a filter basket, the upper edge of which is higher than the upper edge of the fixed outer filter basket. The upper end of the rotary filter basket is connected over a supporting disc to a driven shaft mounted in the bottom of the filter housing. On a bearing member for this shaft projecting into the space within the filter baskets there are fixedly secured scrubbing vanes that extend upwardly toward but terminate short of the supporting disc of the inner filter basket.

Pressure filters are furthermore known on which the rotor simply consists of multiple agitating vanes, or has frusto conical configuration with externally mounted scrubbing vanes. Which type of rotor is best applied depends on the nature of the fibrous suspension to be filtered. It would therefore be economical if the rotor on a pressure filter were interchangeable this however is not possible on the filter basket according to that disclosed in German Pat. No. 1,946,948 because the fixed scrubbing vanes for a filter basket-rotor combination make the installation of a frustoconical rotor impossible.

SUMMARY OF THE INVENTION

The aim of the invention has therefore been to design a multiple stage pressure filter of the type referred to above in such a manner that rotors of drivers types could easily be interchanged with each other, without having to otherwise alter the apparatus. To this end the instant invention proposes disposing the carrier of the rotor below the second filter basket and to secure the scrubbing members to the cover. As by this arrangement the carrier of the rotor, that is customarily designed as a carrier disc or a spider, is exceeded in height by the rotating filter basket of the rotor, it does not obstruct an extension of the scrubbing member, mostly in the form of scrubbing vanes, from the top into the rotating filter basket. A scrubbing member disposed for the second filter basket on the lower housing section can therefore be omitted. To exchange the rotor it is thus only necessary to remove the cover together with the scrubbing member. For rotors with agitating vanes or a cone, it is advisable to design the second filter basket as a separate component mounted on the rotor, so that this component is only required once for both rotor types.

As the second filter basket serves as the first filtering stage it is advisable to seal it off on top against the housing cover. To this end it is proposed to secure a sealing member to the cover that carries the scrubbing vanes, which, together with the cover, seals off the second filter basket at the top. It is simplest to dispose scrubbing vanes on a ring that reaches at least to the top edge of the second filter basket, and if a gasket is provided for the gap between the ring and the second filter basket, such as a labyrinth water sealing gasket of the type used on pressure filters such as discussed here, then no further specification is necessary.

By the present invention it is therefore possible to produce, in a simple manner, a system of pressure filters on which, by merely exchanging the rotor while retaining all housing components with the drive plus the stationary outer filter basket, entirely different filtering principles can be achieved, so that when a different filtering becomes necessary, this can be attained without dismantling the pipe line connections and vital components of the plant.

Further characteristics and details of the invention will become apparent from the appended claims and/or the following specification that explains a preferred embodiment of the invention with three different filtering principles and illustrates same by the likewise inclosed drawings.

BRIEF DESCRIPTION OF THE DRAWINGS

FIG. 1b illustrates a section along line B—B of FIG. 1a;

DESCRIPTION OF THE PREFERRED EMBODIMENTS

Figure 1A:
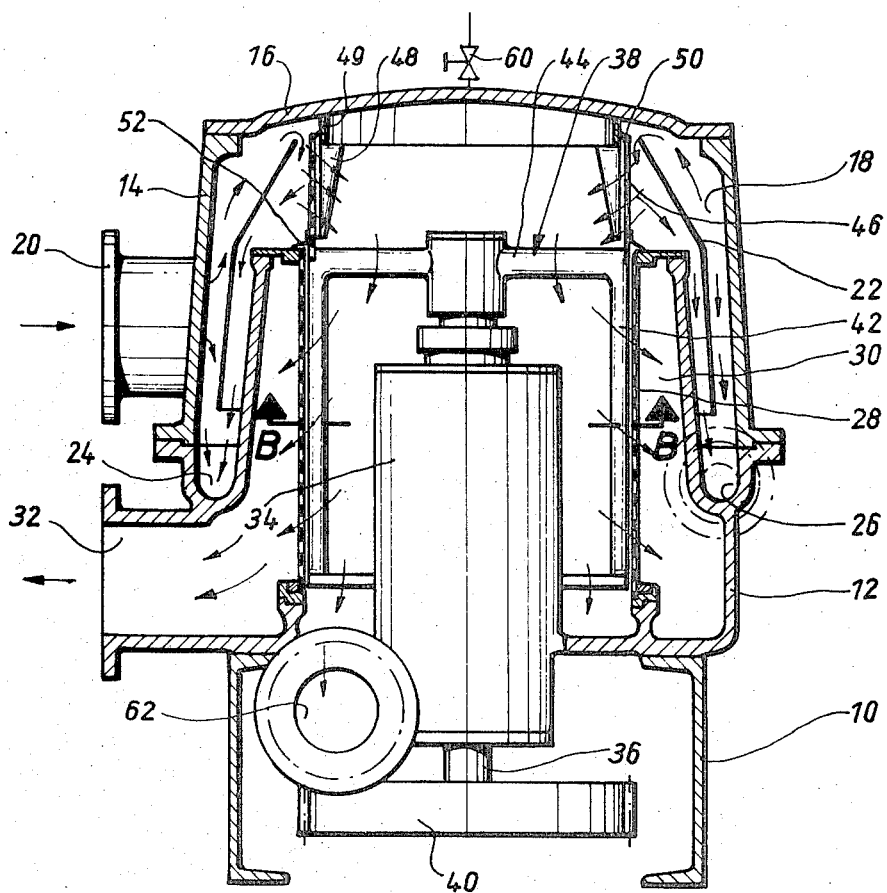
FIG. 1a illustrates a schematic vertical section through a pressure filter with a scrubbing vane rotor.

In an exemplified embodiment according to FIG. 1a, there is mounted on a pedestal 10 a lower housing section 12 upon which the upper housing section 14 rests. The latter is closed on top by cover 16. Upper and lower housing sections together form an outer annular compartment 18 into which stock inlet 20 empties and through which the suspension to be filtered is fed into the apparatus. The outer annular chamber 18 is divided by an annular partition 22 and it furthermore forms a course contaminant gutter 24 that empties into course contaminant outlet 26 that is indicated by dot and dash lines.

The lower housing section 12 accommodates a stationary filter basket 28 that is surrounded by an additional annular compartment 30 and from which the filtered suspension stock can flow out at the stock outlet 32. The lower housing section 12 also includes a bearing assembly 34 in which is mounted the driven shaft 36 of a rotor designated as 38 that rotates inside the stationary filter basket 28. Shaft 36 is driven by a pulley 40 in the form of a belt pulley.

Figure 1B:
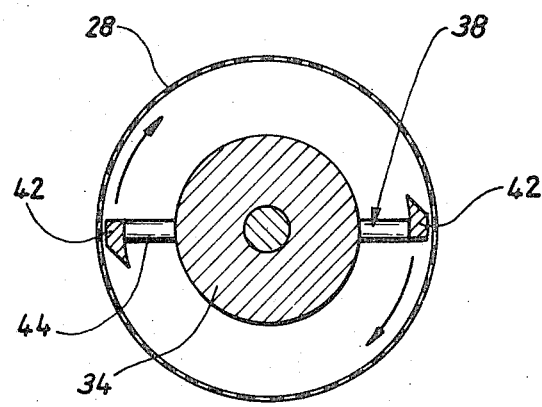

As shown in detail in FIG. 1b, the rotor 38 has scrubbing vanes 42 of a known profile that are secured to a spider 44 which is rotationally secured to shaft 36, but in such a manner that it can be removed from said shaft an upward direction. The scrubbing vanes 42 rotate inside the stationary filter basket 28 at but a minor distance from same.

On spider 44 there is secured a rotating filter basket 46 on which are disposed scrubbing vanes 48 carried by a sealing ring 49 installed on cover 16. The rotating filter basket 46 has a sealing gasket 50 on its upper edge which may, e.g., be a labyrinth water sealing gasket, which for simplicity is not shown. In the same manner there is a second gasket 52 at the bottom edge of rotating filter basket 46 which may also be one of the common split gasket type.

Finally, cover 16 displays an air vent valve 60 and below rotor 38 the lower housing section 12 has a contaminant outlet 62 through which dirt can be eliminated that can pass through rotary filter basket 46 but not through stationary filter basket 28. In this case the rotary filter basket 46 naturally has greater perforations than the stationary filter basket 28.

Flow conditions are indicated by arrows in FIG. 1a. The pressurized fibrous suspension delivered for filtration flows through stock inlet 20 into the pressure filter. Coarse contaminants already settle down upon impinging upon annular partition 22 and are eliminated over gutter 24 and coarse contaminant outlet 26. Then the fibrous suspension flows upwards along annular partition 22 and through rotating filter basket 46 which is scrubbed by scrubbing vanes 48 whose profile may correspond to scrubbing vanes 42 (in profiling, due consideration must be given the direction of rotation indicated by arrows in FIG. 1b). Contaminants that cannot pass through rotating filter basket 46 settle downwardly along the inside of annular partition 22 — to which end the annular partition has (not shown) apertures at its bottom — and thus also arrive at contamination gutter 24. Then the fibrous suspension flows from inside to outside through the filter basket 28, whereby cantaminants not passing through this filter basket precipitate and are eliminated over contaminant outlet 62. The filtrated fibrous suspension leaves the filter through accepted stock outlet 32. Contaminant outlet 62 is naturally in communication with the space inside the stationary filter basket 28 by an aperture (not shown).

Figure 2B:
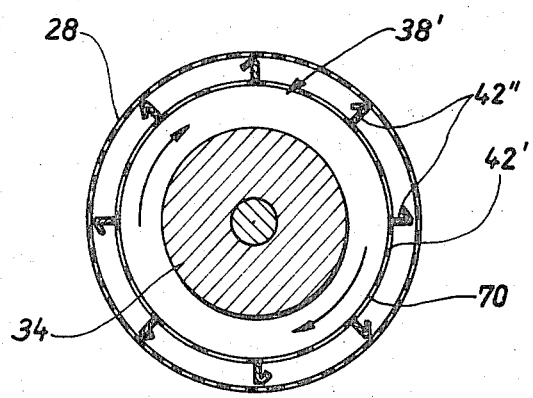
FIG. 2b illustrates a section of a frustoconical rotor taken along the line B—B of FIG. 2a, and FIG. 3 illustrates a section corresponding to FIG. 1a through the pressure filter applying a filter basket rotor.
Figure 2A:
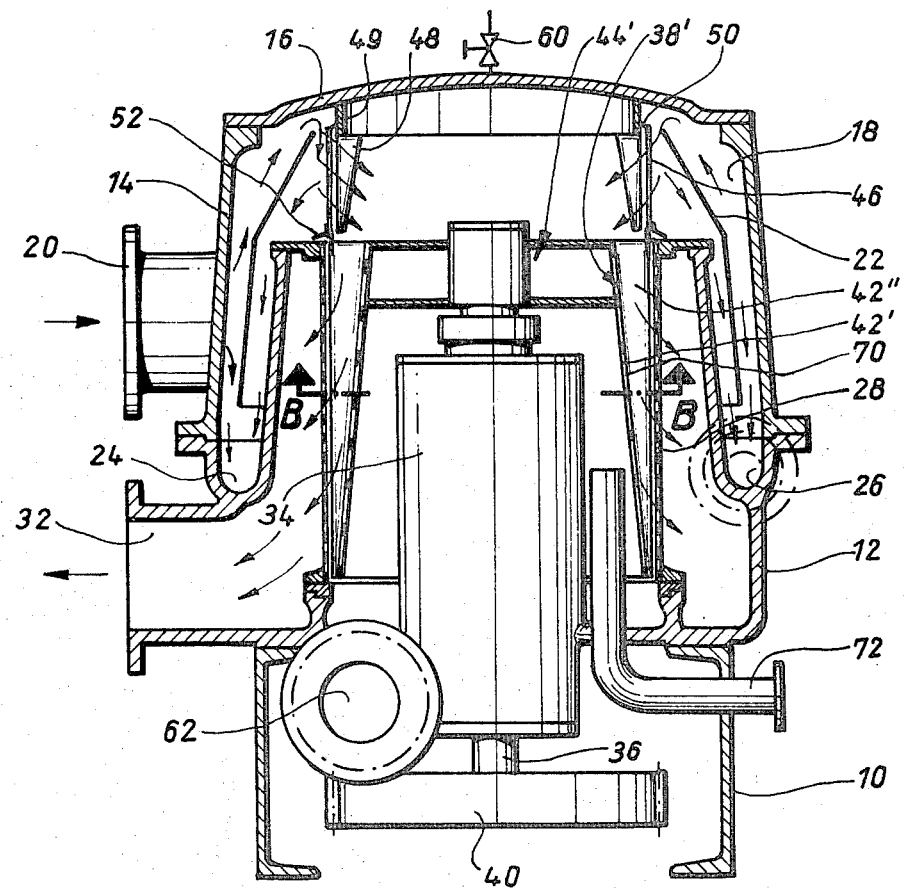
FIG. 2a illustrates a section of the pressure filter corresponding to FIG. 1a in which however the scrubbing vane rotor has been replaced by a frustoconical rotor.

The filter illustrated in FIG. 1a, which is customarily applied in the paper making industry, is particularly adapted for filtering wood pulp, refined stock and cellulose suspensions if the rotor 38 is replaced by rotor 38' shown in FIGS. 2a and 2b, which is a frustoconical rotor. In order to operate on as few components as possible, the rotary filter basket 46 according to FIG. 1a is designed as a separate, detachable component that can also be mounted on the frustoconical rotor 38'.

In the following only those components of the FIGS. 1a and 2b will be described that differ from those of FIGS. 1a and 1b. Components that remain unchanged keep the same reference characters in FIGS. 2a and 2b that they originally have in the embodiments illustrated in FIGS. 1a and 1b.

The frustoconical rotor 38' is secured for rotation to shaft 36 over a supporting disc 44', but akin to the first exemplified embodiment it can be removed from said shaft in an upward direction. Secured to the supporting disc 44' is a frustoconical member 42' displaying a comparatively small number of larger apertures 70 and, on its outer side, has scrubbing vanes 42", the known profile of which is shown in FIG. 2b along with the direction of rotation of frustoconical rotor 38'(see arrows in FIG. 2b).

Finally, the embodiment after FIG. 2a makes provision for a diluent water feed line 72 extending through lower housing section 12 into the interior of frustoconical rotor 38'. Said diluent water flows through the apertures 70 of the frustoconical rotor into the sectors between the scrubbing vanes 42".

The course of flow of the fibrous suspension to be filtered differs in the filters after FIG. 1a and 2a only in that the suspension passing through rotary filter basket 46 cannot at all points stream from above into the space within stationary filter basket 28, but, rather, only within the sectors of scrubbing vanes 42".

Figure 3:
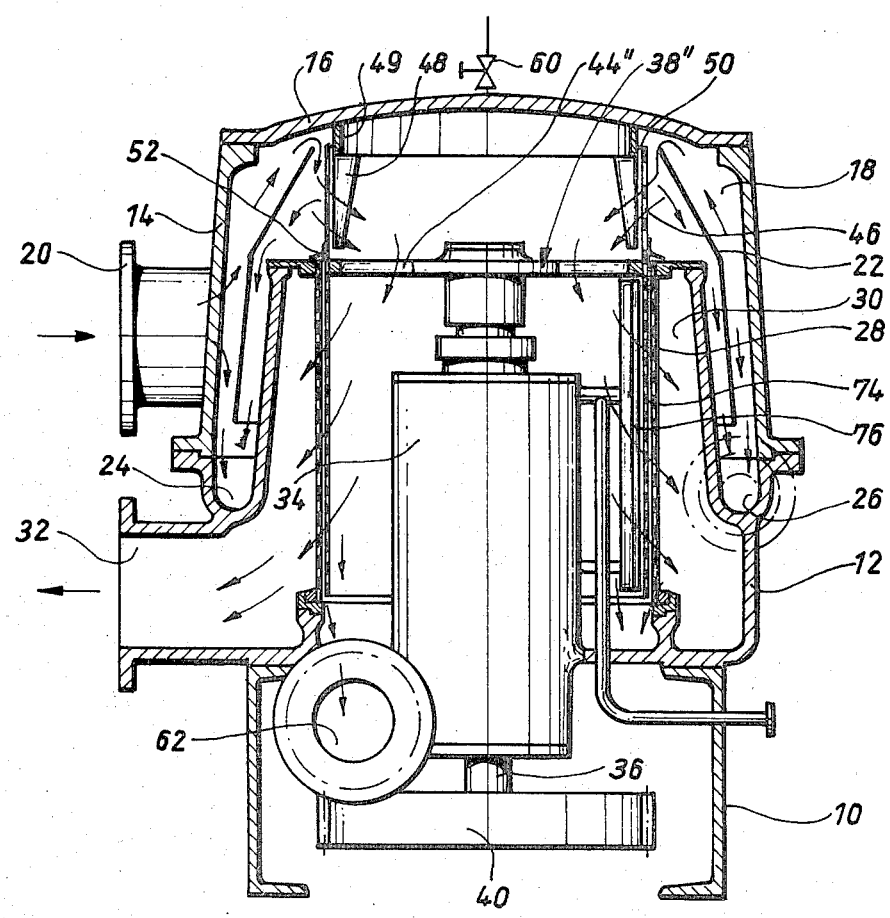

On the other hand, on the exemplified embodiment after FIG. 3, only the rotor has been interchanged in contrast to the machine after FIG. 1a; for in place of rotor 38 with scrubbing vanes 42 there is substituted rotor 38" whose spider 44"carries a rotating filter basket 74 upon which the upper rotating filter basket 46 can be mounted; it is, however, also possible that said filter basket 46 is a part of filter basket 74. This embodiment also disposes of a diluent water feed line 72 and, furthermore, also a fixed scrubbing vane 76 disposed within the filter basket 74.

The course of flow of the machine after FIG. 3 corresponds completely to that of the machine after FIG. 1a.

In that the scrubbing vane 48 for the upper rotating filter basket 46 is disposed on the outlet side of same, it cannot happen that course contaminants such as iron particles or large pieces of wood become clogged between the scrubbing vane and the filter basket. The configuration of a pressure filter according to the present invention is thus particularly suitable for application in the filtering of fibrous suspensions in the paper manufacturing industry.

I claim:

1. In a multiple stage pressure filter for suspensions of fibrous materials with a stock inlet, a stock outlet, a fixed upright filter basket and a rotor concentric thereto rotating within said filter basket, the fixed filter basket and rotor being accommodated within a housing provided with a removable cover, the housing having a bottom portion provided with a bearing assembly and a drive for the rotor, the rotor being provided with carrier means connected to a shaft of the rotor drive, a second filter basket being provided on the rotor and extending above the fixed filter for receiving the suspension to be filter from the stock inlet, at least one fixed scrubbing member associated with the second filter and disposed on the interior thereof, the improvement wherein the carrier means of said rotor is arranged under the second filter basket and said scrubbing member is secured to said cover.

2. A pressure filter as set forth in claim 1, wherein said rotor is interchangeably mounted on a shaft of the rotor drive.

3. A pressure filter as set forth in claim 1, wherein said second filter basket is constructed as a separate component which is mounted on said rotor.

4. A pressure filter as set forth in claim 1, wherein said second filter basket has associated therewith multiple scrubbing members which are secured to said cover.

5. A pressure filter as set forth in claim 4, wherein said scrubbing members are carried by a sealing ring which is secured to said cover and, together with said cover, seals off one end of said second filter basket.

6. A pressure filter as set forth in claim 5, wherein said scrubbing members are carried on a sealing ring that reaches at least to the top edge of said second filter basket and wherein a sealing gasket is provided for a gap extending between said ring and said second filter basket.

7. A pressure filter as set forth in claim 5, wherein said cover has an air vent valve for the interior space partly defined by said second filter basket.

8. A pressure filter as set forth in claim 1, wherein a feed line for diluent water projects into said rotor through an opening in the bottom thereof.

9. A pressure filter as set forth in claim 1, wherein said rotor is constructed as a filter basket, the upper section of which comprises the second filter basket.

* * * * *